Sept. 29, 1953 G. DEAKIN 2,654,000
MULTIPOTENTIAL TYPE REGISTER CONTROLLER
Filed May 20, 1948
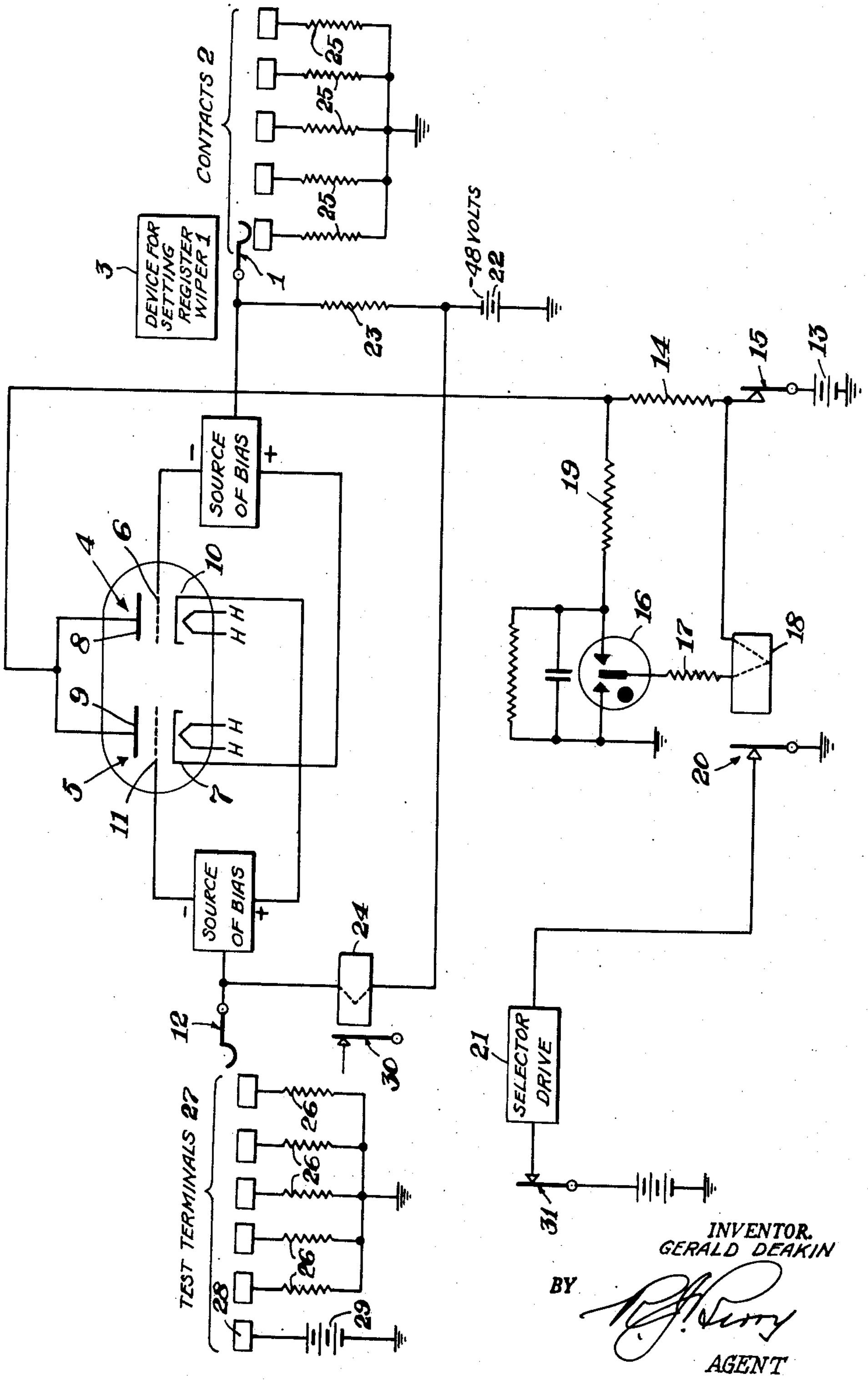
INVENTOR.
GERALD DEAKIN
BY
AGENT Patented Sept. 29, 1953

2,654,000

UNITED STATES PATENT OFFICE 2,654,000

MULTIPOTENTIAL TYPE REGISTER CONTROLLER

Gerald Deakin, New York, N. Y., assignor to International Standard Electric Corporation, New York, N. Y., a corporation of Delaware Application May 20, 1948, Serial No. 28,253

6 Claims. (Cl. 179—18)

The present invention relates to improvements in circuits for receiving a succession of test potentials to compare them individually with a selected control potential and to perform a predetermined control function when it receives a test potential which corresponds to the control potential in a predetermined manner, i. e. is equal to it. More particularly, it relates to improvements in potential comparing devices used in telecommunication systems for controlling the hunting of selector switches which have terminals marked with test potentials, the control in each instance being in accordance with the setting of an element in a register whereby it provides a control potential, for example in accordance with the setting of an element by dialing impulses to provide a control potential representing a digit of a called number.

The present invention is an alternative to a number of potentials-comparing circuits invented by me and described in United States patents of G. Deakin No. 2,351,016, June 13, 1944; G. Deakin et al. No. 2,354,667, August 1, 1944; and G. Deakin et al. No. 2,354,668, August 1, 1944, as well as to other potentials comparing devices which like them draw little or no current from the sources of the potentials being compared. The present arrangement is particularly suitable for use in small exchanges where it is desired to avoid the cost of using multi-potential leads which must be carefully fused and separated.

As is fully set forth in the patents mentioned above, for each digit-registering element of each register there is provided a group of control potentials, any one of which may be applied to a comparing circuit in accordance with the setting of the element, and for each selector switch there is provided a corresponding group of test potentials. In the past the different potentials in each group have been provided by individual batteries or by individual taps from a voltage divider connected across a source of a relatively large direct potential available at a telephone exchange, such as a 48 v. storage battery. Because of the large number of registers and selectors, each source (each individual battery or tap) carries numerous commoned connections and because of this the provision of these potentials in either of these ways produces unsatisfactory results. A short circuit in any of the many connections to a single potential source of one of these kinds or a combination of several leaky connections among them will disturb the relative values of the different potentials provided by these separate sources especially where a common voltage divider is used. Voltage regulating means may be used to lessen the likelihood of such disturbances in the relative values of the different potentials but even this arrangement is not completely reliable and it is very expensive. In addition voltage comparing circuits of the kind referred to above fail to operate dependably at all times because of variations in the contact resistance between the selector test wiper and its cooperating test terminals as well as between the wiper of an automatic switch in the register and its cooperating contacts. Where a bronze terminal has stood idle even for a short time oxidation on its contact surface forms an insulating film which will not readily break down unless the potential difference between the wiper and the terminal exceeds some minimum value such as 10 volts and unless an appreciable current flow occurs between the wiper and the terminal. Thus sometimes a selector wiper will fail to stop when it encounters a test terminal marked with a low potential of say −4 volts even though this corresponds to the control potential provided by the register simply because this low potential is insulated from the selector input to the register by a microscopically thin oxide film which it is unable to break down.

Since any selected control potential and the successively encountered test potentials received by a potentials-comparing circuit are applied respectively to the control grids of a pair of vacuum tubes (i. e. to high input-impedance points), the currents which they will deliver over these input circuits will be extremely small. This increases the number of operational failures due to contact resistance.

It is an object of the present invention to devise an improved potential comparing circuit in which the defects mentioned above are eliminated.

Other objects, features and advantages will be apparent to those skilled in the art from the following detailed description and from the drawing in which the single figure is a circuit diagram showing only a sufficient portion of a potentials-comparing circuit and of control circuits actuated by it to illustrate the improvements comprising the present invention.

On the right hand side of the figure there is shown a circuit for providing different control potentials in accordance with the setting of an element of a register. This circuit includes a wiper 1 of an automatic switch in said element of the register and a group of contacts 2 which cooperate with wiper 1. Block 3 represents a device for setting wiper 1 on any of the contacts 2.

The manner in which block 3 acts to set wiper 1 is not an essential part of the present invention and therefore will not be described in detail. Nor is the exact nature of this automatic switch an essential part of the invention. Where the potentials-comparing circuit is part of (or cooperates with) a register the important thing is that it comprise on its register-input side individual means each actuated in accordance with the dialing of a different digit of a called number (for a call in which the register is engaged) to single out from a group of digit-representing potentials a particular one in accordance with that digit for the called number and to apply it to the register-input of the potentials-comparing circuit. Obviously, this means may comprise a bank of relays, a group of gas tubes, a stepping relay, or any other suitable and well known means for performing the function which for illustrative purposes is herein shown to be performed by the switch 1, 2, 3. A selected control potential is applied to each of a pair of tubes 4, 5 (which may be included in a single envelope) in particular to the control grid 6 of tube 4 and to the cathode 7 of tube 5. Tubes 4 and 5 have their anodes 8, 9 commoned together. The cathode 10 of tube 4 and the control grid 11 of tube 5 are connected to the test wiper 12 of an idle selector switch which is allotted to the call and is to be controlled by the register comprising switch 1, 2, 3. The manner in which an idle selector is allotted and connected to the potentials-comparing circuit is known. Until wiper 12 of the selector switch engages a single test terminal which is marked with the same potential as the selected control potential the potentials applied to the opposite sides of the comparing circuit will be substantially unequal and therefore there will be a considerable potential difference between the control grid and the cathode of each of the vacuum tubes. In each instance until it engages that single test terminal the control grid of one of the tubes will be at a higher potential level than its associated cathode and in the other tube the opposite condition will exist, and therefore one tube will be cut off, and one will draw considerable current. The common output circuit of the tubes is arranged so that when the combined plate current of the tubes is of appreciable magnitude, i. e. when either tube is drawing considerable current the voltage comparing circuit will not be actuated. However, when test wiper 12 engages said single test terminal neither of the tubes will draw significant current and the unique condition will obtain under which the potentials-comparing circuit will be actuated. Though a vacuum tube will not ordinarily draw its maximum current when the control grid-to-cathode bias is zero nevertheless it may draw an appreciable current. To prevent this a source of biasing potential is provided between the control grid of each tube and the cathode of the other. When control grid 11 and cathode 10 are connected to a test potential which is substantially equal to the input control potential, grids 6 and 11 will both be at a first potential level. While cathodes 7 and 10 will be at about the same level with respect to each other that level will be more positive (or less negative) than said first level. If the biases are large this difference between the level of the grids and that of the cathodes may be sufficient completely to cut off the tubes.

The commoned anodes of the two tubes are energized from a source of positive potential 13 over a dropping resistor 14 and a contact-and-armature 15 of a starting relay (not completely shown). A gas discharge tube 16 has its anode connected to the same source of potential over a current limiting resistor 17, the winding of a stopping relay 18 and the contact-and-armature 15. The cathode of the gas tube is grounded and its starting electrode is connected to the common anode circuit of the tubes 4, 5 over a current limiting resistor 19. When both of the tubes 4, 5 are cut off at the same time the drop across resistor 14 becomes substantially zero and all of the potential provided by source 13 is impressed across the control gap of gas tube 16, i. e. between its cathode and firing electrode.

The resulting ionization of the control gap starts ionization of the main gap so that a large current passes from battery 13, through the winding of stopping relay 18, over resistor 17, and back to battery over the main discharge path in tube 16. Relay 18 opens its back contact 20 and stops the hunting of selector wiper by opening the energizing circuit of selector drive 21.

The starting relay (not completely shown) prepares the comparing circuit at 15 and starts hunting of the selector switch at 31, both in a known manner, after the register has been allotted to a call and has been set by dialing impulses.

A single source 22 of a relatively large potential, for example the 48 volt storage battery at the exchange, is connected to the register wiper over a common voltage dividing resistor 23 and to the test wiper of the selector over a corresponding common voltage dividing impedance shown herein as the winding of a relay 24. Each of the terminals in the register automatic switch 1, 2, 3 is connected to ground over an individual voltage dividing resistor 25 of predetermined value different from that of any of the others. Each of the resistors 25 has such a value of resistance with respect to resistor 23 that when wiper 1 rests on its associated contact 2 the resulting voltage division will mark that contact with a desired predetermined control potential. When the wiper 1 reaches any terminal 2 the initial voltage difference between them will be the full potential of the source −48 volts. In addition the values of resistor 23 and resistors 25 are so selected that an appreciable current will pass through the loop circuit completed each time that wiper 1 encounters a terminal 2. This arrangement assures the breakdown of any oxide film on the terminal since the large initial potential difference will puncture it and the substantial flow of current through the breakdown point will complete the lowering of the contact resistance. Accordingly almost immediately after wiper 1 engages a terminal 2 they both will acquire a potential determined by the relative values of the resistor 25 associated with that terminal and common resistor 23, a potential predetermined as the control potential to be selected whenever the wiper is in this position. Unfailingly this will be applied as the control potential to the voltage comparing circuit.

The arrangement for providing the group of selector test potentials is similar. In the particular embodiment shown herein the common voltage dividing impedance used in this arrangement is the winding of auxiliary relay 24. A group of individual voltage dividing resistors 26 corresponds to the group of resistors 25 of automatic switch 1, 2, 3. These resistors are individually connected to test terminals 27 of the selector switch.

A particular terminal, 28, is connected to the positive pole of a source of potential 29 so that when the wiper 12 reaches its position relay 24 will draw much more current than for any other position of the selector switch. Relay 24 is adjusted, e. g. the tension of the spring biasing its armature on its break contact is set, so that it will not be actuated by the current through any of the voltage dividing loops.

As is shown in the patents mentioned above it is sometimes desirable in certain arrangements utilizing a potentials-comparing circuit to include an auxiliary relay which is energized directly over the test wiper of the selector switch when it reaches a predetermined test potential. To this end I have previously employed a polarized relay i. e. a relay in series with a rectifier, and have marked only that predetermined test terminal with a potential having the proper polarity for operating the relay where as all of the other test potentials encountered by the wiper are of the opposite polarity. In the embodiment shown herein auxiliary relay 24 is included in an arrangement such that it need not be polarized and such that at the same time its winding serves as the common voltage dividing inpedance on the selector-input side of the circuit. The function performed by relay 24 when it is actuated is not an essential part of this invention.

When the selector test wiper encounters each of its associated terminals it will break down any oxide film which it may encounter and, as a result, an accurately predictable potential will be applied to the selector-input side of the comparing circuit. For this reason dependable operation is assured so long as the values of the resistors 26 and of the winding of relay 24 are correct.

I have found that where the resistance values of resistor 23 and of the winding of relay 24 are of the order of 1500 ohms and where battery 22 provides —48 volts, dependable operation can be secured where the actual values of the resistors 25 and 26 are within 5 percent of their rated values. It is obvious that the operation of the improved voltage comparing circuit does not depend upon the regulation of the common source of potential 22. If the value of this should for any reason vary by even several volts it will have no appreciable effect upon the dependabilty of operation.

If desired, relay 24 may be arranged so that when it is operated its armature 30 will pull up from its back contact to open the energizing circuit of selector drive 21 thereby stopping the selector independently of the action of the voltage comparing circuit when the selector has reached this particular position, e. g. this might be the end of a group of P. B. X lines or an end terminal reached because the desired one is associated with a busy line. However, the desirabilty for stopping hunting of a selector switch at a certain position is well known and is no part of the present invention.

In the patents mentioned above I have shown relay arrangements for accomplishing resetting of a potentials-comparing circuit after each actuation thereof as well as circuits for associationg it with other portions of a telecommunication system. However, these arrangements are not a part of the present arrangement and therefore are not disclosed herein in detail.

By way of illustration the comparing circuit shown herein has been described as a component part of a register in a multipotential system. Obviously, however, its usefulness is not so limited. In fact, a circuit of this kind can be used in a great many ways. For example, in telecommunication systems it can be used in an arrangement for controlling a register in accordance with the class of service to which a calling line is entitled, and in an entirely different field of application it can be used to control a push button operated automatic elevator.

What is claimed is:

1. A control device comprising a potentials-comparing circuit having a first input for receiving a control potential and a second input for receiving test potentials, means for applying a control potential to said first input, means for successively applying different test potentials to the second input, means in the comparing circuit operable when it receives a test potential corresponding to the control potential to perform a control function, the means for applying test potentials comprising a plurality of contacts each connected to a common potential point over a voltage dividing impedance individual to each contact, means including a contact-engaging element for successively connecting the contacts to said second input, a common voltage dividing impedance, a source of direct current potential, and means for connecting the source of direct potential and the common voltage dividing impedance in series between the common point and said contact engaging element, whereby when said element is on a contact, current from said source will flow through said common impedance and the impedance individual to said contact, and the values of said impedances will determine the potential on said element.

2. A control device as in claim 1, in which the means for applying a control potential comprises means for selectively providing different control potentials one at a time, the last-mentioned means comprising a second plurality of contacts each connected to a second common point over an individual voltage dividing impedance, means including a second contact-engaging element for successively connecting individual contacts of the second plurality thereof to said first input, a second voltage dividing impedance common to said second plurality of contacts, and means for connecting the second common voltage dividing impedance and the source of direct current potential in series between the second common potential point and the second contact engaging element.

3. A control device as in claim 1, in which said common voltage dividing impedance is the winding of a relay, there is associated with said plurality of contacts a predetermined particular contact connected to said common potential point over another source of direct current potential which is poled to series aid the first mentioned source thereof when the contact engaging element engages said particular contact, and the relay is adjusted to be actuated only when its winding carries a greater current than any caused when the contact engaging element engages any of the plurality of contacts other than said particular contact.

4. A control device as in claim 1, in which the contacts are of a conductive material which tends to become oxidized in the presence of air, that said source of direct potential is of sufficient magnitude to puncture an oxide coating formed on one of the contacts during an operational period of idleness, and that the values of the common voltage dividing impedance and each of the individual voltage dividing impedances is selected so that for the value of said direct potential appreciable current is drawn from the source thereof whenever the contact engaging element engages one of the contacts.

5. A control device as in claim 1, in which the means for applying a control potential comprises means for selectively providing different control potentials one at a time, the last-mentioned means comprising a second plurality of contacts each connected to a second common point over an individual voltage dividing impedance, means including a second contact-engaging element for successively connecting individual contacts of the second plurality thereof to said first input, a second common voltage dividing impedance, and means for connecting said source of direct current potential and the second common voltage dividing impedance in series between said second common point and said second contact engaging element, the ratio of each of the first-mentioned individual voltage dividing impedances to the first-mentioned common voltage dividing impedance being substantially equal to the ratio of one of said last-mentioned individual voltage dividing impedances to the second common voltage dividing impedance, whereby when said second element is on one of said second contacts, current from said source will flow through said second common impedance and the impedance individual to said second contact, and the values of said second impedance will determine the potential on said second element.

6. A control device comprising a potentials-comparing circuit having a first input for receiving a control potential and a second input for receiving test potentials, means for applying a control potential to said first input, means having a plurality of successive conditions for successively applying different test potentials to the second input, means in the comparing circuit operable when it receives a test potential corresponding to the control potential applied to said first input to perform a control function, driving means for causing the means for applying test potentials to establish said successive conditions, means responsive to the operation of the comparing circuit to stop the operation of the driving means, the means for applying test potentials comprising a plurality of contacts each connected to a common point over an individual voltage dividing impedance, means including a contact-engaging element for successively connecting the contacts to said second input, a common voltage dividing impedance, a source of direct current potential, and means for connecting the source of direct potential and the common voltage dividing impedance in series between the common point and the contact engaging element.

GERALD DEAKIN.

References Cited in the file of this patent

UNITED STATES PATENTS

| Number | Name | Date |
|---|---|---|
| Re. 22,861 | Deakin | Apr. 8, 1947 |
| 1,785,818 | Peterson | Dec. 23, 1930 |
| 2,237,413 | Clark | Apr. 8, 1941 |
| 2,238,223 | Kozma | Apr. 15, 1941 |
| 2,354,667 | Deakin | Aug. 1, 1944 |
| 2,354,682 | Herbig | Aug. 1, 1944 |
| 2,428,024 | Herbig | Sept. 30, 1947 |
| 2,444,065 | Pouliart | June 29, 1948 |